(12) United States Patent
Bickerstaff

(10) Patent No.: US 7,941,344 B1
(45) Date of Patent: May 10, 2011

(54) METHOD AND APPARATUS FOR TIME INCREMENTED PURCHASE PRICE DISCOUNTING

(75) Inventor: Ryan Martin Bickerstaff, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 1239 days.

(21) Appl. No.: 11/550,721

(22) Filed: Oct. 18, 2006

(51) Int. Cl.
*G06Q 30/00* (2006.01)
*G06Q 40/00* (2006.01)

(52) U.S. Cl. .................. 705/26.1; 705/27.1; 705/14.35; 705/37

(58) Field of Classification Search .............. 705/26, 705/27, 37, 14.35
See application file for complete search history.

(56) References Cited

U.S. PATENT DOCUMENTS

| | | | |
|---|---|---|---|
| 5,873,069 A * | 2/1999 | Reuhl et al. | 705/20 |
| 6,119,100 A * | 9/2000 | Walker et al. | 705/20 |
| 6,990,460 B2 * | 1/2006 | Parkinson | 705/10 |
| 7,213,754 B2 * | 5/2007 | Eglen et al. | 235/383 |
| 7,805,383 B2 * | 9/2010 | Veit et al. | 705/400 |
| 7,853,473 B2 * | 12/2010 | Davis et al. | 705/10 |
| 2002/0042749 A1 * | 4/2002 | Yugami et al. | 705/26 |
| 2003/0023567 A1 * | 1/2003 | Berkovitz et al. | 705/400 |
| 2005/0197946 A1 * | 9/2005 | Williams et al. | 705/36 |

OTHER PUBLICATIONS

Pricing on the Internet Mui Kung; Kent B Monroe; Jennifer Cox Journal of Product and Brand Management 2002 11, 4-5 ABI/INFORM Global p. 274.*

* cited by examiner

*Primary Examiner* — Jeffrey A Smith
*Assistant Examiner* — Courtney Stopp
(74) *Attorney, Agent, or Firm* — Gunnison, McKay & Hodgson, L.L.P.; Philip McKay

(57) ABSTRACT

A method and apparatus for time incremented purchase price discounting includes a process for time incremented purchase price discounting whereby a seller offers a product for sale on a seller website at an initial purchase price and then the product purchase price is automatically discounted by a predetermined amount at predetermined increments of time until either, the product is sold, or a seller determined minimum product purchase price is reached.

18 Claims, 3 Drawing Sheets

METHOD AND APPARATUS FOR TIME INCREMENTED PURCHASE PRICE DISCOUNTING

BACKGROUND

Today virtually every major retailer maintains some sort of Internet presence, typically in the form of a website, and most include an "online" product purchasing capability for conducting electronic commerce. In addition, the Internet has provided smaller retailers an opportunity to sell products into a wide range of markets, and to broadly dispersed customer bases, without incurring the significant overhead of a "brick and mortar" infrastructure. Finally, the introduction of auction websites has provided virtually anyone with an opportunity to conduct electronic commerce with a minimal investment of time and/or money.

As was the case with traditional retail sales, many sellers conducting electronic commerce offer discounts through their website. As was the case in traditional retail sales, in many instances, discounts are offered on a particular product based on the sellers need to reduce, or eliminate, the product from inventory in light of one of numerous possible business considerations including seasonal considerations, discontinued lines of products, warehousing issues, or any one of various reasons that can motivate a seller to offer discounts on a particular product in order to reduce, or eliminate, the product inventory.

Of course, as was the case in the traditional retail market, a seller wishing to reduce or eliminate a product inventory still wishes to obtain the highest possible purchase price for that product. However, the seller must balance his or her need to reduce the inventory of the product, and the threat of being forced to warehouse a large inventory of the product indefinitely, with the desire to obtain the highest possible price. Using current electronic commerce systems, a seller typically chooses a relatively static discount price for the product, often based on the seller's cost and, in some instances, on market research. The seller then lists, or displays, the product on the seller website at the determined static discount purchase price. Then, using current methods, the seller typically waits to see if the product sells at the discounted price, and the seller is thereby typically subjected to considerable stress and second guessing. This is because, if the product sells quickly, the seller must wonder if he or she discounted the purchase price of the product too aggressively, and therefore forfeited potential profits. On the other hand, if the product does not sell quickly, the seller typically holds out as long as his or her nerves can take, and then, all too often, does statically discount the price too aggressively in order to ensure the product sells in an action driven, more or less, by panic. Consequently, using current electronic-commerce methods and systems, it is very difficult for the seller to find the optimum discount that allows the seller to reduce, or eliminate, his or her inventory of a product while at the same time obtaining the maximum purchase price the market will bear.

Likewise, despite an auction website's potential to find the highest price the market will bear by unleashing raw market forces, auction websites present similar problems determining and/or obtaining the highest product purchase price. Using a typical current auction website, a seller lists a product on the auction website at an initial purchase price, which in many cases is zero, but in other cases is some minimal value established by the seller. Using a typical current auction website, the product remains listed on the website for a specified period of time and potential buyers are given the opportunity to bid on the item in classic auction style. Then, using a typical auction website, the highest bidder at the end of the specified period of time wins the auction and the right to purchase the product at that highest bid price.

While, the auction website process described above appears to be driven by the purest of market forces, and therefore appears to have the best potential for obtaining the highest purchase price for a product, in many instances the eventual price paid by the highest bidder is less than what the seller considers satisfactory, and is often significantly less than what the market actually would bear. This is because, unlike classic auctions, auctions conducted on an auction website typically include the artificial time limit discussed above and all the potential buyers are typically aware of the auction time limit. Consequently, unlike traditional auctions, auctions websites, with theses artificial time limits on the product listings, are susceptible to last minute "low balling" strategies that have evolved along with the auction website market. One of these strategies includes a potential buyer, and/or buyers, holding off on aggressively bidding on a product until the last few minutes, and often seconds, of the auction time limit. Then the buyers submit bids that are a trivial amount higher than the highest existing bid. As more and more potential buyers have begun to practice this style of bidding, many auctions actually run as intended, i.e., competitively, for only the last few seconds of the auction and it is the time limit set for the listing, not the market value of the product, that determines the sale price. i.e., the buyer who submits the last trivial increase before the cut off time wins. Consequently, more and more sellers have found themselves making sales of products at purchase prices far below what the market would actually bear absent these "lowball" bidding strategies.

Some auction websites allow a seller to offer a "buy it now" purchase price which, if selected by a potential buyer, bypasses the auction process and gives the potential buyer the opportunity to purchase the product immediately at the "buy it now" price. However, when deciding a "buy it now" price, sellers using current auction websites are in a similar dilemma to the electronic commerce retail sellers trying to set a discount price discussed above, in that, if the "buy it now price" is set too high, potential buyers, especially those potential buyers not interested in monitoring the auction website for extended periods of time, will simply not purchase the product and, electronically, walk away. Then the product purchase price becomes susceptible to the lowball bidding discussed above. On the other hand, if the "buy it now" price is too low, the seller is never provided the opportunity to receive the true highest purchase price the market will bear.

SUMMARY

In accordance with one embodiment, a method and apparatus for time incremented purchase price discounting includes a process for time incremented purchase price discounting whereby a seller offers a product on the seller website at an initial purchase price. Then, in one embodiment, the product purchase price is automatically discounted by predetermined discount increments for each predetermined increment of time that passes.

In one embodiment, a seller first determines to list a product for sale on a seller website. In one embodiment, the seller then selects an initial purchase price for the product, typically a purchase price equal to, or greater than, the highest purchase price the seller believes the market will bear. In one embodiment, the seller also selects a minimum purchase price for the product, typically, a purchase price below which the seller does not wish to sell the product. In one embodiment, the seller then selects a time increment, in one embodiment a customizable time increment, to associate with the product and a discount increment, in one embodiment a customizable time increment, to associate with the product. In one embodiment, the seller then lists and/or displays the product on the seller website at the initial purchase price. Then, in one embodiment, the purchase price of the product is discounted by the selected discount increment upon the passing of each selected time increment until, either the product is purchased, or the minimum product purchase price is reached.

In one embodiment, a seller also determines to list a product for sale on a seller website. In one embodiment, the seller also selects an initial purchase price for the product, typically a purchase price equal to or greater than the highest purchase price the seller believes the market will bear. In one embodiment, the seller also selects a minimum purchase price for the product, typically a purchase price below which the seller does not wish to sell the product. In one embodiment, the seller then selects a time increment, in one embodiment a customizable time increment, to associate with the product and a discount increment, in one embodiment a customizable time increment, to associate with product. In one embodiment, the seller then lists and/or displays the product on the seller website at the initial purchase price. In one embodiment, potential buyers are also provided the opportunity to submit maximum price bids which they are willing to pay for the product. Then, in one embodiment, the purchase price of the product is discounted by the selected discount increment upon the passing of each selected time increment until, either the discounted purchase price of the product matches a maximum purchase price bid submitted by one or more buyers, and the product is purchased at that price, or the minimum product purchase price is reached.

Using the method and apparatus for time incremented purchase price discounting, and a process for time incremented purchase price discounting disclosed herein, a seller is not required to determine a static purchase price, to either offer the product for sale, or to use as a "buy it now" price on an auction website. Instead, using the method and apparatus for time incremented purchase price discounting, and a process for time incremented purchase price discounting disclosed herein, a seller can incrementally explore the market price, thereby electronically "trolling" for the highest purchase price the market will bear and bypassing the second guessing and uncertainty of current static website pricing methods and systems.

In addition, using the method and apparatus for time incremented purchase price discounting, and a process for time incremented purchase price discounting disclosed herein, the exploration of the market price is conducted automatically using time and discount increments chosen by the seller so that the seller maintains significant control in a "hands-off" manner. Consequently, the method and apparatus for time incremented purchase price discounting, and a process for time incremented purchase price discounting disclosed herein, allows the seller to, in essence, conduct real-time market research, and act on the results of that research, without devoting significant time, money, or energy to the process.

In addition, when the method and apparatus for time incremented purchase price discounting, and a process for time incremented purchase price discounting disclosed herein, is used within the context of an Internet auction website, or any auction website, many of the auction website "low ball" strategies are bypassed, or their effects are minimized or negated, due to the fact that as the "buy it now" purchase price of the product listed is discounted in a time incremented manner, the single auction listing becomes essentially a series of time incremented auctions with self adjusting "buy it now" auction bypass prices. Consequently, the "low ball" strategy discussed above involving a buyer, or buyers, waiting until the last minute/second to submit insignificant bid increases is not effective because the incrementally decreasing "buy it now" price provides a bypass or "opt out" of the timed biding option and therefore allows normal market forces to reemerge and dictate the sale price.

In addition, as discussed in more detail below, using the below embodiments, with little or no modification and/or user input, there is considerable flexibility, adaptability, and opportunity for customization to meet the specific needs of various user's under numerous circumstances.

Figure 1:
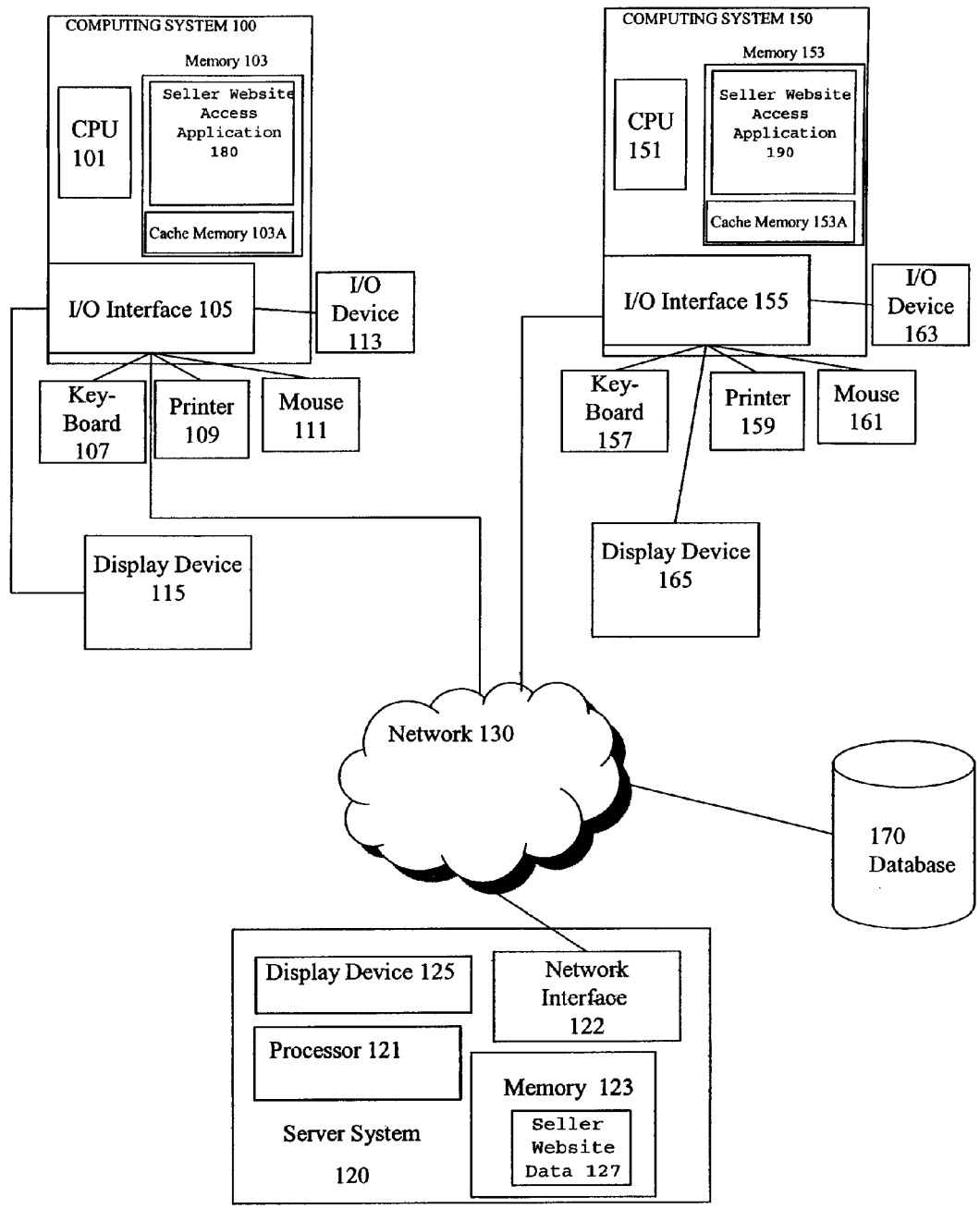
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and apparatus for time incremented purchase price discounting includes a process for time incremented purchase price discounting (200 in FIGS. 2 and 300 in FIG. 3) whereby a seller offers a product on the seller website at an initial purchase price and then the product purchase price is automatically discounted by a predetermined amount at predetermined increments of time.

In one embodiment, a seller first determines to list a product for sale on a seller website. In one embodiment, the seller then selects an initial purchase price for the product, typically a purchase price equal to, or greater than, the highest purchase price the seller believes the market will bear. In one embodiment, the seller also selects a minimum purchase price for the product, typically, a purchase price below which the seller does not wish to sell the product. In one embodiment, the seller then selects a time increment to associate with the product and a discount increment to associate with product. In one embodiment, the seller then lists and/or displays the product on the seller website at the initial purchase price. Then, in one embodiment, the purchase price of the product is discounted by the selected discount increment upon the passing of each selected time increment until, either the product is purchased, or the minimum product purchase price is reached.

In one embodiment, a seller also determines to list a product for sale on a seller website. In one embodiment, the seller also selects an initial purchase price for the product, typically a purchase price equal to or greater than the highest purchase price the seller believes the market will bear. In one embodiment, the seller also selects a minimum purchase price for the product, typically a purchase price below which the seller does not wish to sell the product. In one embodiment, the seller then selects a time increment to associate with the product and a discount increment to associate with product. In one embodiment, the seller then lists and/or displays the product on the seller website at the initial purchase price. In one embodiment, potential buyers are provided the opportunity to submit maximum price bids which they are willing to pay for the product. Then, in one embodiment, the purchase price of the product is discounted by the selected discount increment upon the passing of each selected time increment until, either the discounted purchase price of the product matches a purchase price bid submitted by one or more buyers, and the product is purchased at that price, or the minimum product purchase price is reached.

Using the method and apparatus for time incremented purchase price discounting, and a process for time incremented purchase price discounting disclosed herein, a seller is not required to determine a static purchase price at which to either offer the product for sale, or to use as a "buy it now" price on auction website. Instead, using the method and apparatus for time incremented purchase price discounting, and a process for time incremented purchase price discounting disclosed herein, a seller can incrementally explore the market price, thereby electronically "trolling" for the highest purchase price the market will bear and thereby bypassing the second guessing and uncertainty of current static website pricing methods and systems.

In addition, using the method and apparatus for time incremented purchase price discounting, and a process for time incremented purchase price discounting disclosed herein, the exploration of the market price is conducted automatically using time and discount increments chosen by the seller so that the seller maintains significant control in a hands off manner. Consequently, the method and apparatus for time incremented purchase price discounting, and a process for time incremented purchase price discounting disclosed herein, allows the seller to, in essence, conduct real-time market research, and act of the results of that research, without devoting significant time, money, or energy to the process.

In addition, when the method and apparatus for time incremented purchase price discounting, and a process for time incremented purchase price discounting disclosed herein, is used within the context of an Internet auction website, or any auction website, many of the auction website strategies are bypassed, or their effects are minimized or negated, due to the fact that as the "buy it now" purchase price of the product listed is discounted in a time incremented manner, the single auction listing becomes essentially a series of time incremented auctions with self adjusting "buy it now" auction bypass prices. Consequently, the strategy discussed above involving a buyer, or buyers, waiting until the last minute to submit insignificant bid increases is not effective because the incrementally decreasing "buy it now" price provides a bypass or "opt out" of the timed biding option and therefore allows normal market forces to reemerge and dictate the sale price.

In addition, as discussed in more detail below, using the below embodiments, with little or no modification and/or user input, there is considerable flexibility, adaptability, and opportunity for customization to meet the specific needs of various user's under numerous circumstances.

As used herein the term "seller website" refers to any website through which a buyer can commit to buy, and a seller can commit to sell, a product. In various embodiments, a seller website can include, but is not limited to: a seller's electronic store front or other Internet presence; a seller's catalog sales site; a third party website listing a given seller's products for sale; an auction website; auction-based website; a website including an auction component; an Internet auction website and/or portal; and any other website presence allowing a buyer to commit to buy, and a seller to commit to sell, a product over a network such as the Internet, or other private or public network, that is of interest to a user such as a Local Area Network (LAN), a Wide Area Network (WAN), a public network, such as the Internet, a private network, or other network capable of allowing communication between two or more computing systems, whether available or known at the time of filing or as later developed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the seller website access applications described herein make use of input provided to the computer device implementing the process and/or application for time incremented purchase price discounting, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a process and/or application for time incremented purchase price discounting, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more seller website access applications 180 stored, in whole, or in part, therein, that is a parent system for, is used by, or include, as discussed below, a process and/or application for time incremented purchase price discounting, such as processes 200 and 300, discussed below. In one embodiment, seller website access application 180 is an Internet browser. In one embodiment, seller website access application 180 is a seller website access portal of any other application providing computing system 100 access to a seller website over a network such as network 130 discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process and/or application for time incremented purchase price discounting, such as processes 200 and 300, and a seller website access application 180, can be loaded, in whole, or in part, into computing system 100 via I/O device 113, such as from a CD, DVD or floppy disk containing all, or part, of seller website access application 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more seller website access applications 190 stored, in whole, or in part, therein, that is a parent system for, is used by, or include, as discussed below, a process and/or application for time incremented purchase price discounting, such as processes 200 and 300. In one embodiment, seller website access application 190 is an Internet browser. In one embodiment, seller website access application 190 is a seller website access portal of any other application providing computing system 150 access to a seller website over a network such as network 130 discussed below.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process and/or application for time incremented purchase price discounting, such as processes 200 and 300, and a seller website access application 190, can be loaded, in whole, or in part, into computing system 150 via I/O device 163, such as from a CD, DVD or floppy disk containing all, or part, of seller website access application 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process and/or application for time incremented purchase price discounting, such as processes 200 and 300, and/or seller website access application 180 and/or seller website access application 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for time incremented purchase price discounting, such as processes 200 and 300, and a seller website access application 180 and/or seller website access application 190 are stored in whole, or in part, in server system 120. In addition, in one embodiment, server system memory 123 includes website data 127 used to generate and display a seller website, such as a business website, and/or an Internet auction website, and/or a product manufacturer website and/or a user website as discussed in more detail below.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for time incremented purchase price discounting, such as processes 200 and 300, and a seller website access application 180 and/or seller website access application 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for time incremented purchase price discounting, such as processes for time incremented purchase price discounting 200 and 300, and a seller website access application, such as seller website access applications 180 and/or 190, are sometimes referred to herein, alternatively, as a process, an application, a module, a program, a component of a software system, a component of a software package, a component of a parent system, or a feature of a parent system, this terminology is illustrative only. In some embodiments, a process and/or application for time incremented purchase price discounting, such as processes 200 and 300, and a seller website access application, such as seller website access applications 180 and/or 190, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for time incremented purchase price discounting, such as processes 200 and 300, and a seller website access application, such as seller website access applications 180 and/or 190, discussed herein, by processor 101, processor 151, or server system processor 121, results in the operations of an agent computer process (not shown) and/or a rule computer process (not shown).

In one embodiment, a process and/or application for time incremented purchase price discounting, such as processes 200 and 300, and a seller website access application, such as seller website access applications 180 and/or 190, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals Transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removable from the computing system.

For example, all, or part, of a process and/or application for time incremented purchase price discounting, such as processes 200 and 300, and a seller website access application, such as seller website access applications 180 and/or 190, discussed herein, may be stored in a memory that is physically located in a location, such as server system memory 123, or database 170, of FIG. 1, different from a computing system, such as computing systems 100 and/or 150 of FIG. 1, utilizing a process and/or application for time incremented purchase price discounting, such as processes 200 and 300, and a seller website access application, such as seller website access applications 180 and/or 190. In one embodiment, all, or part, of a process and/or application for time incremented purchase price discounting, such as processes 200 and 300, and a seller website access application, such as seller website access applications 180 and/or 190, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process and/or application for time incremented purchase price discounting, such as processes 200 and 300, and a seller website access application, such as seller website access applications 180 and/or 190, discussed herein, is a portable computer, a workstation, a two-way pager, a cellular telephone, a smart phone, a digital wireless telephone, a personal digital assistant, a server computer, an Internet appliance, an Internet access device, a mobile Internet access device, or any other device that includes components that can execute all, or part, of a process and/or application for time incremented purchase price discounting, such as processes 200 and 300, and a seller website access application, such as seller website access applications 180 and/or 190, discussed herein, in accordance with at least one of the embodiments as described herein. Similarly, in another embodiment, a process and/or application for time incremented purchase price discounting, such as processes 200 and 300, and a seller website access application, such as seller website access applications 180 and/or 190, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

A method and apparatus for time incremented purchase price discounting includes a process for time incremented purchase price discounting whereby a seller offers a product for sale on the seller website at an initial purchase price and then the product purchase price is automatically discounted by a predetermined amount at predetermined increments of time until either, the product is sold, or a seller determined minimum product purchase price is reached.

In one embodiment, a seller first determines to list a product for sale on a seller website. In one embodiment, the seller then selects an initial purchase price for the product, typically a purchase price equal to, or greater than, the highest purchase price the seller believes the market will bear. In one embodiment, the seller also selects a minimum purchase price for the product, typically, a purchase price below which the seller does not wish to sell the product. In one embodiment, the seller then selects a time increment to associate with the product and a discount increment to associate with product. In one embodiment, the seller then lists and/or displays the product on the seller website at the initial purchase price. Then, in one embodiment, the purchase price of the product is discounted by the selected discount increment upon the passing of each selected time increment until, either the product is purchased, or the minimum product purchase price is reached.

Figure 2:
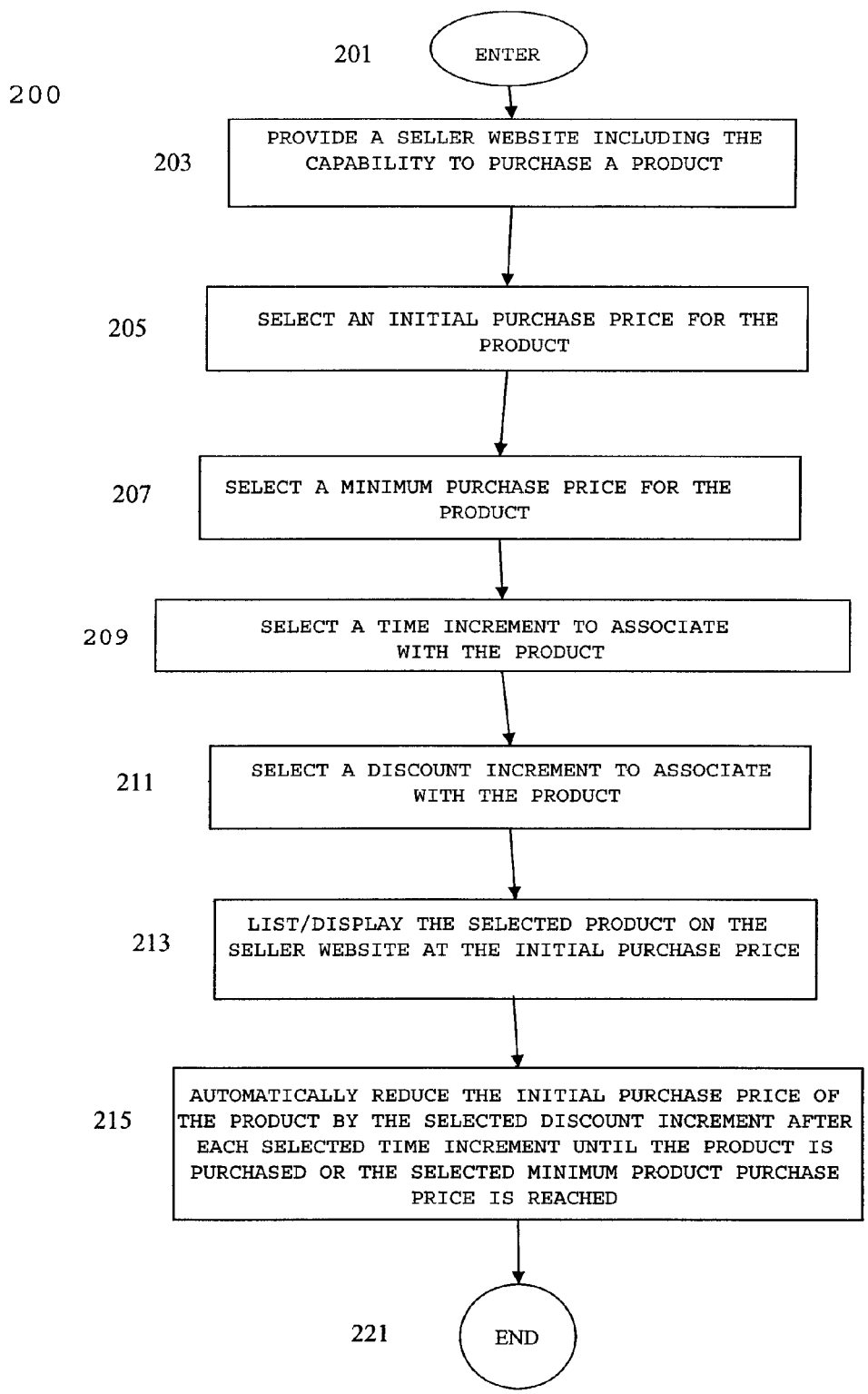
FIG. 2 is a flow chart depicting a process for time incremented purchase price discounting in accordance with one embodiment.

FIG. 2 is a flow chart depicting a process for time incremented purchase price discounting 200 in accordance with one embodiment. Process for time incremented purchase price discounting 200 begins at ENTER OPERATION 201 and process flow proceeds to PROVIDE A SELLER WEBSITE INCLUDING THE CAPABILITY TO PURCHASE A PRODUCT OPERATION 203.

In one embodiment, at PROVIDE A SELLER WEBSITE INCLUDING THE CAPABILITY TO PURCHASE A PRODUCT OPERATION 203, a seller website is provided through which sellers can offer one or more products for sale over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

As used herein the term "seller website" refers to any website through which a buyer can commit to buy, and a seller can commit to sell, a product. In various embodiments, a seller website can include, but is not limited to: a seller's electronic store front or other Internet presence; a seller's catalog sales site; a third party website listing a given seller's products for sale; an auction website; auction-based website; a website including an auction component; an Internet auction website and/or portal; and any other website presence allowing a buyer to commit to buy, and a seller to commit to sell, a product over a network such as the Internet, or other private or public network, that is of interest to a user such as a Local Area Network (LAN), a Wide Area Network (WAN), a public network, such as the Internet, a private network, or other network capable of allowing communication between two or more computing systems, whether available or known at the time of filing or as later developed.

In one embodiment, the seller website provided at PROVIDE A SELLER WEBSITE INCLUDING THE CAPABILITY TO PURCHASE A PRODUCT OPERATION 203 is a seller's website and/or electronic storefront and/or electronic catalog/shopping center, maintained by, maintained for, used by, associated with, and/or owned by the seller of the product. In one embodiment, the seller website provided at PROVIDE A SELLER WEBSITE INCLUDING THE CAPABILITY TO PURCHASE A PRODUCT OPERATION 203 is an auction website, such as an Internet auction website, through which a seller can list and/or offer for sale one or more products to potential buyers.

In one embodiment, the seller website provided at PROVIDE A SELLER WEBSITE INCLUDING THE CAPABILITY TO PURCHASE A PRODUCT OPERATION 203 (FIG. 2) is provided by a server system, such as server system 120 of FIG. 1, where the data for creating, operating, and/or associated with, the seller website provided at PROVIDE A SELLER WEBSITE INCLUDING THE CAPABILITY TO PURCHASE A PRODUCT OPERATION 203 (FIG. 2) is stored.

In one embodiment, the seller website provided at PROVIDE A SELLER WEBSITE INCLUDING THE CAPABILITY TO PURCHASE A PRODUCT OPERATION 203 (FIG. 2) is provided by a computing system, such as computing systems 100 or 150 of FIG. 1, where the data for creating, operating, and/or associated with, the seller website provided at PROVIDE A SELLER WEBSITE INCLUDING THE CAPABILITY TO PURCHASE A PRODUCT OPERATION 203 (FIG. 2) is stored.

In one embodiment, all, or part of, the data associated with the seller website provided at PROVIDE A SELLER WEBSITE INCLUDING THE CAPABILITY TO PURCHASE A PRODUCT OPERATION 203 (FIG. 2) is stored in a database, such as database 170 of FIG. 1 by any one of the various means known to those of skill in the art and/or as discussed herein and/or as known at the time of filing or as developed thereafter.

Numerous seller websites are currently available and well known to those of skill in the art that offer the capability to purchase and/or bid on products "online" via the Internet, or other private and/or public network, and the methods, means, mechanisms and hardware for offering, operating and maintaining a seller website including the capability to purchase and/or bid on products via the Internet, or other private and/or public network, are well known to those of skill in the art. Consequently, a more detailed discussion of seller websites that offer the capability to purchase and/or bid on products "online" via the Internet, or other private and/or public network, and the methods, means, mechanisms and hardware for offering, operating and maintaining a seller website including the capability to purchase and/or bid on products via the Internet, or other private and/or public network, is omitted here to avoid detracting from the invention.

Returning to FIG. 2, in one embodiment, once a seller website is provided at PROVIDE A SELLER WEBSITE INCLUDING THE CAPABILITY TO PURCHASE A PRODUCT OPERATION 203, process flow proceeds to SELECT AN INITIAL PURCHASE PRICE FOR THE PRODUCT OPERATION 205.

In one embodiment, at SELECT AN INITIAL PURCHASE PRICE FOR THE PRODUCT OPERATION 205 the seller of the product selects an initial purchase price for the product. In one embodiment, the initial purchase price selected at SELECT AN INITIAL PURCHASE PRICE FOR THE PRODUCT OPERATION 205 is a purchase price for the product to be offered on the seller website of PROVIDE A SELLER WEBSITE INCLUDING THE CAPABILITY TO PURCHASE A PRODUCT OPERATION 203. In embodiments where the seller website of PROVIDE A SELLER WEBSITE INCLUDING THE CAPABILITY TO PURCHASE A PRODUCT OPERATION 203 is an auction website, the initial purchase price can be the initial "buy it now" price associated with the product. In one embodiment, the initial purchase price is selected such that the initial purchase price is equal to, or greater than, the highest purchase price the seller feels the market will bear. In other embodiments, the initial purchase price selected at SELECT AN INITIAL PURCHASE PRICE FOR THE PRODUCT OPERATION 205 is chosen by any means, and for any reasons, known to the user/seller.

In one embodiment, the initial purchase price selected at SELECT AN INITIAL PURCHASE PRICE FOR THE PRODUCT OPERATION 205 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

Returning to FIG. 2, in one embodiment, once the initial purchase price selected at SELECT AN INITIAL PURCHASE PRICE FOR THE PRODUCT OPERATION 205 is entered into a computing system and/or server system, data representing the selected initial purchase price is transferred to the seller website of PROVIDE A SELLER WEBSITE INCLUDING THE CAPABILITY TO PURCHASE A PRODUCT OPERATION 203 by any one of numerous methods, means, mechanisms and apparatuses for transferring data between two computing systems, databases, server systems, websites, and/or networks, known to those of skill in the art at the time of filing and/or as developed later. In one embodiment, the selected initial purchase price is transferred to the seller website of PROVIDE A SELLER WEBSITE INCLUDING THE CAPABILITY TO PURCHASE A PRODUCT OPERATION 203 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Returning to FIG. 2, in one embodiment, once the initial purchase price of the product is selected at SELECT AN INITIAL PURCHASE PRICE FOR THE PRODUCT OPERATION 205, process flow proceeds to SELECT A MINIMUM PURCHASE PRICE FOR THE PRODUCT OPERATION 207.

In one embodiment, at SELECT A MINIMUM PURCHASE PRICE FOR THE PRODUCT OPERATION 207 the seller selects a minimum purchase price for the product which represents the minimum purchase price the seller is willing to accept for the product. In one embodiment, the minimum purchase price is the minimum purchase price that will be listed on the seller website. In one embodiment, the minimum purchase price is the minimum "buy it now" price shown on an auction website. In one embodiment, the minimum purchase price is determined by the seller based on any means, or desires, known to the user. In one embodiment the minimum purchase price may be zero, or a nominal amount.

In one embodiment, the minimum purchase price selected at SELECT A MINIMUM PURCHASE PRICE FOR THE PRODUCT OPERATION 207 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

In one embodiment, once the minimum purchase price selected at SELECT A MINIMUM PURCHASE PRICE FOR THE PRODUCT OPERATION 207 is entered into a computing system and/or server system, data representing the selected minimum purchase price is transferred to the seller website of PROVIDE A SELLER WEBSITE INCLUDING THE CAPABILITY TO PURCHASE A PRODUCT OPERATION 203 by any one of numerous methods, means, mechanisms and apparatuses for transferring data between two computing systems, databases, server systems, websites, and/or networks, known to those of skill in the art at the time of filing and/or as developed later. In one embodiment, the selected initial purchase price is transferred to the seller website of PROVIDE A SELLER WEBSITE INCLUDING THE CAPABILITY TO PURCHASE A PRODUCT OPERATION 203 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Returning to FIG. 2, in one embodiment, once the seller selects a minimum purchase price at SELECT A MINIMUM PURCHASE PRICE FOR THE PRODUCT OPERATION 207, process flow proceeds to SELECT A TIME INCREMENT TO ASSOCIATE WITH THE PRODUCT OPERATION 209.

In one embodiment at SELECT A TIME INCREMENT TO ASSOCIATE WITH THE PRODUCT OPERATION 209, the seller chooses a time increment to be associated with the product. In one embodiment, the time increment chosen determines how often, i.e., at what time interval the product purchase price is to be discounted. The choice of the time increment at SELECT A TIME INCREMENT TO ASSOCIATE WITH THE PRODUCT OPERATION 209 is highly dependent on, among other things: the discount increment selected by the seller at SELECT A DISCOUNT INCREMENT TO ASSOCIATE WITH THE PRODUCT OPERATION 211, as discussed below; the type of product being offered for sale; the initial purchase price selected at SELECT AN INITIAL PURCHASE PRICE FOR THE PRODUCT OPERATION 205; the minimum purchase price selected at SELECT A MINIMUM PURCHASE PRICE FOR THE PRODUCT OPERATION 207; any seasonal or other product considerations that the seller feels effects the speed at which the product needs to be reduced and/or eliminated from inventory; in the case where the seller website of PROVIDE A SELLER WEBSITE INCLUDING THE CAPABILITY TO PURCHASE A PRODUCT OPERATION 203 is an auction website, the length of time allotted to the product listing within the auction; and any other consideration of interest and/or consequence to the seller.

In one embodiment, the time increment selected at SELECT A TIME INCREMENT TO ASSOCIATE WITH THE PRODUCT OPERATION 209 can range from minutes to months depending on the factors above. In addition, in one embodiment, the time increment can be customized such that the time increment changes as time passes. For instance, in one embodiment, for the first day a product is offered for sale, or other selected timeframe, a first time increment can be used, for instance two hours. Then on the second day, or other selected timeframe, a second time increment, for instance four hours, can be used. This customization of time increments over time is particularly useful when combined with customizable discount increments as discussed below with respect to SELECT A DISCOUNT INCREMENT TO ASSOCIATE WITH THE PRODUCT OPERATION 211. In addition, the customizable time increment feature can be used to establish a pre-announcement period for a product sale by selecting a relatively long first, or beginning time increment, for instance a first time increment of 24 or 48 hours.

In one embodiment, the time increment selected at SELECT A TIME INCREMENT TO ASSOCIATE WITH THE PRODUCT OPERATION 209 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

In one embodiment, once the time increment selected at SELECT A TIME INCREMENT TO ASSOCIATE WITH THE PRODUCT OPERATION 209 is entered into a computing system and/or server system, data representing the selected time increment is transferred to the seller website of PROVIDE A SELLER WEBSITE INCLUDING THE CAPABILITY TO PURCHASE A PRODUCT OPERATION 203 by any one of numerous methods, means, mechanisms and apparatuses for transferring data between two computing systems, databases, server systems, websites, and/or networks, known to those of skill in the art at the time of filing and/or as developed later. In one embodiment, the selected time increment data is transferred to the seller website of PROVIDE A SELLER WEBSITE INCLUDING THE CAPABILITY TO PURCHASE A PRODUCT OPERATION 203 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

In one embodiment, once a time increment is selected at SELECT A TIME INCREMENT TO ASSOCIATE WITH THE PRODUCT OPERATION 209, process flow proceeds to SELECT A DISCOUNT INCREMENT TO ASSOCIATE WITH THE PRODUCT OPERATION 211.

In one embodiment, at SELECT A DISCOUNT INCREMENT TO ASSOCIATE WITH THE PRODUCT OPERATION 211 the seller selects a discount increment to be applied to the purchase price of the product after the passing of each of the time increment selected at SELECT A TIME INCREMENT TO ASSOCIATE WITH THE PRODUCT OPERATION 209.

The choice of the discount increment at SELECT A DISCOUNT INCREMENT TO ASSOCIATE WITH THE PRODUCT OPERATION 211 is highly dependent on: the time increment selected by the seller at SELECT A TIME INCREMENT TO ASSOCIATE WITH THE PRODUCT OPERATION 209, as discussed above; the type of product being offered for sale; the initial purchase price selected at SELECT AN INITIAL PURCHASE PRICE FOR THE PRODUCT OPERATION 205; the minimum purchase price selected at SELECT A MINIMUM PURCHASE PRICE FOR THE PRODUCT OPERATION 207; any seasonal or other product considerations that the seller feels effects the speed at which the product needs to be reduced and/or eliminated from inventory; in the case where the seller website of PROVIDE A SELLER WEBSITE INCLUDING THE CAPABILITY TO PURCHASE A PRODUCT OPERATION 203 is an auction website, the length of time allotted to the product listing within the auction; and any other consideration of interest and/or consequence to the seller.

In one embodiment, the discount increment selected at SELECT A DISCOUNT INCREMENT TO ASSOCIATE WITH THE PRODUCT OPERATION 211 is a monetary amount to be subtracted from the product purchase price each of the intervals of SELECT A TIME INCREMENT TO ASSOCIATE WITH THE PRODUCT OPERATION 209. In one embodiment, the discount increment selected at SELECT A DISCOUNT INCREMENT TO ASSOCIATE WITH THE PRODUCT OPERATION 211 is a percentage of the product purchase price of the previous time interval, as an example, a discount of 10% of the previous interval's purchase price. In other embodiments, the discount increment selected at SELECT A DISCOUNT INCREMENT TO ASSOCIATE WITH THE PRODUCT OPERATION 211 is user defined and/or customizable based on the needs and/or desires of the user, the seller website provider, or the provider of process for time incremented purchase price discounting 200.

In addition, in one embodiment, the discount increment selected at SELECT A DISCOUNT INCREMENT TO ASSOCIATE WITH THE PRODUCT OPERATION 211 can be customized such that the discount increment varies as time passes, or after a defined number of time increments of SELECT A TIME INCREMENT TO ASSOCIATE WITH THE PRODUCT OPERATION 209 pass. For instance, in one embodiment, on the first day, or other selected timeframe, a first discount increment can be used, for instance 20% of the previous time increments purchase price, or a specified monetary amount, such as $20.00. Then on the second day, or other selected timeframe, a second discount increment, for instance 10% of the previous time increments purchase price, or a specified monetary amount, such as $10.00, can be used. This process can be repeated for any number of relevant time frames and/or discount increments desired. The optional customization of discount increments over time at SELECT A DISCOUNT INCREMENT TO ASSOCIATE WITH THE PRODUCT OPERATION 211 is also useful when combined with customizable time increments as discussed above with respect to SELECT A TIME INCREMENT TO ASSOCIATE WITH THE PRODUCT OPERATION 209.

In one embodiment, the discount increment selected at SELECT A DISCOUNT INCREMENT TO ASSOCIATE WITH THE PRODUCT OPERATION 211 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

In one embodiment, once the discount increment selected at SELECT A DISCOUNT INCREMENT TO ASSOCIATE WITH THE PRODUCT OPERATION 211 is entered into a computing system and/or server system, data representing the selected discount increment is transferred to the seller website of PROVIDE A SELLER WEBSITE INCLUDING THE CAPABILITY TO PURCHASE A PRODUCT OPERATION 203 by any one of numerous methods, means, mechanisms and apparatuses for transferring data between two computing systems, databases, server systems, websites, and/or networks, known to those of skill in the art at the time of filing and/or as developed later. In one embodiment, the selected discount increment data is transferred to the seller website of PROVIDE A SELLER WEBSITE INCLUDING THE CAPABILITY TO PURCHASE A PRODUCT OPERATION 203 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Those of skill the art will readily recognize that the choice of operations discussed above, and, in particular, the order of the operations: SELECT AN INITIAL PURCHASE PRICE FOR THE PRODUCT OPERATION 205; SELECT A MINIMUM PURCHASE PRICE FOR THE PRODUCT OPERATION 207; SELECT A TIME INCREMENT TO ASSOCIATE WITH THE PRODUCT OPERATION 209; and SELECT A DISCOUNT INCREMENT TO ASSOCIATE WITH THE PRODUCT OPERATION 211, shown above was chosen for illustrative purposes only and that the operations discussed above could, in other embodiments, be performed in any order to meet the desires and/or needs of the seller. Consequently the order of operations discussed above in no way limits the scope of the invention.

In one embodiment, once the discount increment is selected by the seller at SELECT A DISCOUNT INCREMENT TO ASSOCIATE WITH THE PRODUCT OPERATION 211, process flow proceeds to LIST/DISPLAY THE SELECTED PRODUCT ON THE SELLER WEBSITE AT THE INITIAL PURCHASE PRICE OPERATION 213.

In one embodiment, at LIST/DISPLAY THE SELECTED PRODUCT ON THE SELLER WEBSITE AT THE INITIAL PURCHASE PRICE OPERATION 213 the product is listed, and/or displayed, on the seller website of PROVIDE A SELLER WEBSITE INCLUDING THE CAPABILITY TO PURCHASE A PRODUCT OPERATION 203 at the initial purchase price of SELECT AN INITIAL PURCHASE PRICE FOR THE PRODUCT OPERATION 205. In one embodiment, as noted above, in addition to the initial purchase price of SELECT AN INITIAL PURCHASE PRICE FOR THE PRODUCT OPERATION 205, the seller website includes: the data representing the discount increment to be applied to the product purchase price of SELECT A DISCOUNT INCREMENT TO ASSOCIATE WITH THE PRODUCT OPERATION 211; the data representing the time increment to be applied to the product purchase price of SELECT A TIME INCREMENT TO ASSOCIATE WITH THE PRODUCT OPERATION 209; and the minimum purchase price of SELECT A MINIMUM PURCHASE PRICE FOR THE PRODUCT OPERATION 207.

In one embodiment, once the product is listed by the seller on the seller website of PROVIDE A SELLER WEBSITE INCLUDING THE CAPABILITY TO PURCHASE A PRODUCT OPERATION 203 at the initial purchase price of SELECT AN INITIAL PURCHASE PRICE FOR THE PRODUCT OPERATION 205 at LIST/DISPLAY THE SELECTED PRODUCT ON THE SELLER WEBSITE AT THE INITIAL PURCHASE PRICE OPERATION 213, process flow proceeds to AUTOMATICALLY REDUCE THE INITIAL PURCHASE PRICE OF THE PRODUCT BY THE SELECTED DISCOUNT INCREMENT AFTER EACH SELECTED TIME INCREMENT UNTIL THE PRODUCT IS PURCHASED OR THE SELECTED MINIMUM PRODUCT PURCHASE PRICE IS REACHED OPERATION 215.

In one embodiment, at AUTOMATICALLY REDUCE THE INITIAL PURCHASE PRICE OF THE PRODUCT BY THE SELECTED DISCOUNT INCREMENT AFTER EACH SELECTED TIME INCREMENT UNTIL THE PRODUCT IS PURCHASED OR THE SELECTED MINIMUM PRODUCT PURCHASE PRICE IS REACHED OPERATION 215, the initial purchase price of the product of SELECT AN INITIAL PURCHASE PRICE FOR THE PRODUCT OPERATION 205 is decreased by an amount equal to the discount increment of SELECT A DISCOUNT INCREMENT TO ASSOCIATE WITH THE PRODUCT OPERATION 211 with the passing of each time increment of SELECT A TIME INCREMENT TO ASSOCIATE WITH THE PRODUCT OPERATION 209 until either the product is purchased or the product purchase price drops to the minimum purchase price of SELECT A MINIMUM PURCHASE PRICE FOR THE PRODUCT OPERATION 207.

In one embodiment, once the product is either purchased, or the product purchase price drops to the minimum purchase price of SELECT A MINIMUM PURCHASE PRICE FOR THE PRODUCT OPERATION 207, at AUTOMATICALLY REDUCE THE INITIAL PURCHASE PRICE OF THE PRODUCT BY THE SELECTED DISCOUNT INCREMENT AFTER EACH SELECTED TIME INCREMENT UNTIL THE PRODUCT IS PURCHASED OR THE SELECTED MINIMUM PRODUCT PURCHASE PRICE IS REACHED OPERATION 215, process flow proceeds to END OPERATION 221 where process for time incremented purchase price discounting 200 is exited and/or returned to ENTER OPERATION 201.

Using process for time incremented purchase price discounting 200, a seller is not required to determine a static purchase price at which to either offer the product for sale, or to use as a "buy it now" price on auction website. Instead, using process for time incremented purchase price discounting 200, a seller can incrementally explore the market price, thereby electronically "trolling" for the highest purchase price the market will bear and bypassing the second guessing and uncertainty of current static website pricing methods and systems.

In addition, using process for time incremented purchase price discounting 200, the exploration of the market price is conducted automatically and by time and discount increments chosen by the seller so that the seller maintains significant control in "hands-off" manner. Consequently, process for time incremented purchase price discounting 200 allows the seller to, in essence, conduct real-time market research, and act on the results of that research, without devoting significant time or energy to the process.

In addition, when process for time incremented purchase price discounting 200 is used within the context of an Internet auction website, or any auction website, many of the auction website strategies are bypassed, or their effects are minimized or negated, due to the fact that as the "buy it now" purchase price of the product listed is discounted in a time incremented manner, the single auction listing becomes essentially a series of time incremented auctions with self adjusting "buy it now" auction bypass prices. Consequently, the strategy discussed above involving a buyer, or buyers, waiting until the last minute to submit insignificant bid increases is not effective because the incrementally decreasing "buy it now" price provides a bypass or opt out of the timed biding option and therefore allows normal market forces to reemerge and dictate the sale price.

In one embodiment, potential buyers are provided the opportunity to place maximum price bids for the product. Then, in one embodiment, using the process for time incremented purchase price discounting, the seller offers the product on the seller website at an initial purchase price and the product purchase price is automatically discounted by a predetermined amount at predetermined increments of time until one of more maximum bids match the discounted product purchase price.

Figure 3:
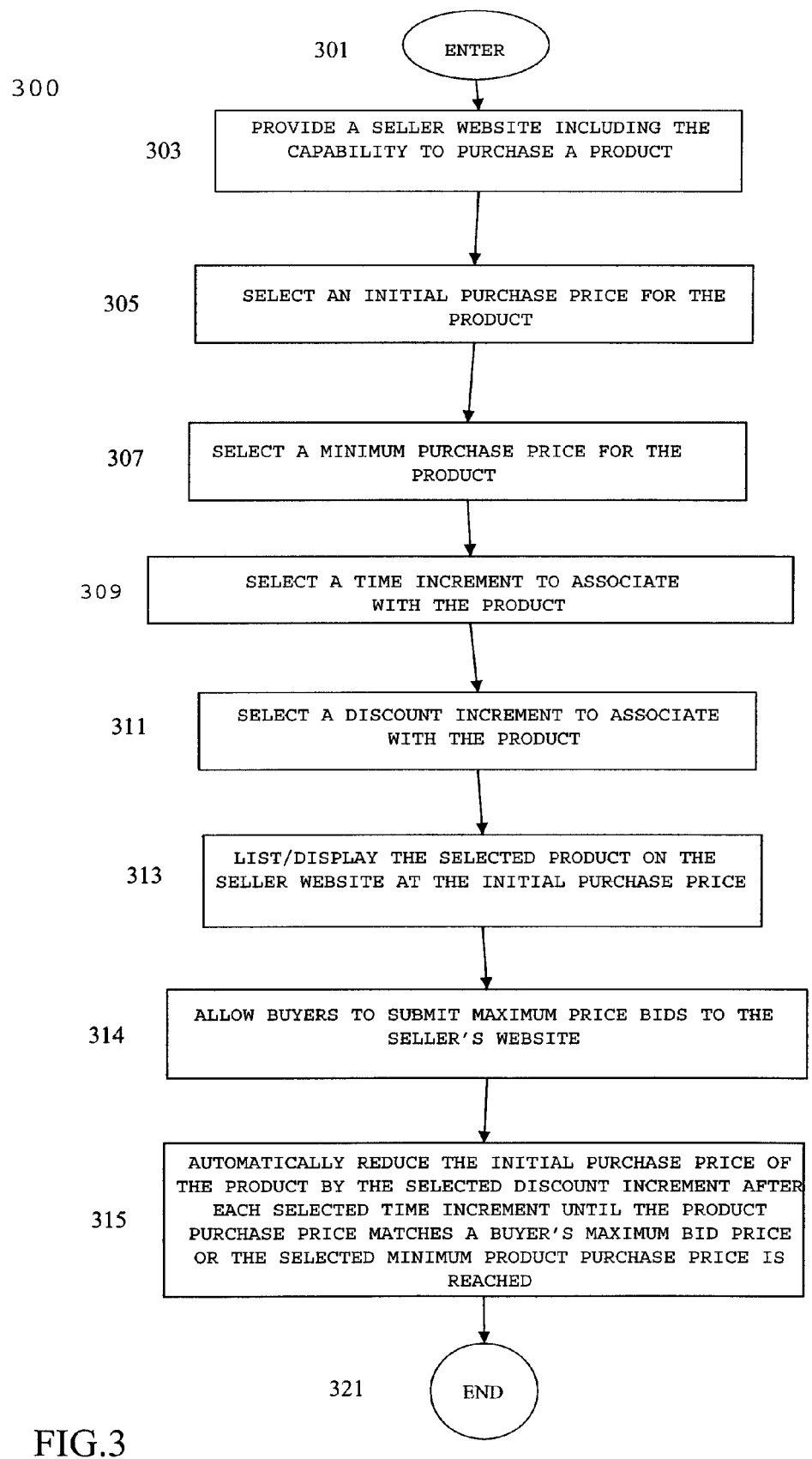
FIG. 3 is a flow chart depicting a process for time incremented purchase price discounting in accordance with one embodiment.

FIG. 3 is a flow chart depicting a process for time incremented purchase price discounting 300 in accordance with one embodiment. Process for time incremented purchase price discounting 300 begins at ENTER OPERATION 301 and process flow proceeds to PROVIDE A SELLER WEBSITE INCLUDING THE CAPABILITY TO PURCHASE A PRODUCT OPERATION 303.

In one embodiment, at PROVIDE A SELLER WEBSITE INCLUDING THE CAPABILITY TO PURCHASE A PRODUCT OPERATION 303, a seller website is provided that is substantially similar to the seller website of PROVIDE A SELLER WEBSITE INCLUDING THE CAPABILITY TO PURCHASE A PRODUCT OPERATION 203 of FIG. 2 discussed above. Consequently, the discussion above with respect to PROVIDE A SELLER WEBSITE INCLUDING THE CAPABILITY TO PURCHASE A PRODUCT OPERATION 203 of FIG. 2 is applicable to, and incorporated here for, PROVIDE A SELLER WEBSITE INCLUDING THE CAPABILITY TO PURCHASE A PRODUCT OPERATION 303.

Numerous seller websites are currently available and well known to those of skill in the art that offer the capability to purchase and/or bid on products "online" via the Internet, or other private and/or public network, and the methods, means, mechanisms and hardware for offering, operating and maintaining a seller website including the capability to purchase and/or bid on products via the Internet, or other private and/or public network, are well known to those of skill in the art. Consequently, a more detailed discussion of seller websites that offer the capability to purchase and/or bid on products "online" via the Internet, or other private and/or public network, and the methods, means, mechanisms and hardware for offering, operating and maintaining a seller website including the capability to purchase and/or bid on products via the Internet, or other private and/or public network, is omitted here to avoid detracting from the invention.

Returning to FIG. 3, in one embodiment, once a seller website is provided at PROVIDE A SELLER WEBSITE INCLUDING THE CAPABILITY TO PURCHASE A PRODUCT OPERATION 303, process flow proceeds to SELECT AN INITIAL PURCHASE PRICE FOR THE PRODUCT OPERATION 305.

In one embodiment, at SELECT AN INITIAL PURCHASE PRICE FOR THE PRODUCT OPERATION 305 the seller of the product selects an initial purchase price for the product. In one embodiment, the initial purchase price selected at SELECT AN INITIAL PURCHASE PRICE FOR THE PRODUCT OPERATION 305 is a purchase price for the product to be offered on the seller website of PROVIDE A SELLER WEBSITE INCLUDING THE CAPABILITY TO PURCHASE A PRODUCT OPERATION 303. In embodiments where the seller website of PROVIDE A SELLER WEBSITE INCLUDING THE CAPABILITY TO PURCHASE A PRODUCT OPERATION 303 is an auction website, the initial purchase price can be the initial "buy it now" price associated with the product. In one embodiment, the initial purchase price is selected such that the initial purchase price is equal to, or greater than, the highest purchase price the seller feels the market will bear. In other embodiments, the initial purchase price selected at SELECT AN INITIAL PURCHASE PRICE FOR THE PRODUCT OPERATION 305 is chosen by any means, and for any reasons, known to the user/seller.

In one embodiment, the initial purchase price selected at SELECT AN INITIAL PURCHASE PRICE FOR THE PRODUCT OPERATION 305 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

Returning to FIG. 3, in one embodiment, once the initial purchase price selected at SELECT AN INITIAL PURCHASE PRICE FOR THE PRODUCT OPERATION 305 is entered into a computing system and/or server system, data representing the selected initial purchase price is transferred to the seller website of PROVIDE A SELLER WEBSITE INCLUDING THE CAPABILITY TO PURCHASE A PRODUCT OPERATION 303 by any one of numerous methods, means, mechanisms and apparatuses for transferring data between two computing systems, databases, server systems, websites, and/or networks, known to those of skill in the art at the time of filing and/or as developed later. In one embodiment, the selected initial purchase price is transferred to the seller website of PROVIDE A SELLER WEBSITE INCLUDING THE CAPABILITY TO PURCHASE A PRODUCT OPERATION 303 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Returning to FIG. 3, in one embodiment, once the initial purchase price of the product is selected at SELECT AN INITIAL PURCHASE PRICE FOR THE PRODUCT OPERATION 305, process flow proceeds to SELECT A MINIMUM PURCHASE PRICE FOR THE PRODUCT OPERATION 307.

In one embodiment, at SELECT A MINIMUM PURCHASE PRICE FOR THE PRODUCT OPERATION 307 the seller selects a minimum purchase price for the product which represents the minimum purchase price the seller is willing to accept for the product. In one embodiment, the minimum purchase price is the minimum purchase price that will be listed on the seller website. In one embodiment, the minimum purchase price is the minimum "buy it now" price shown on an auction website. In one embodiment, the minimum purchase price is determined by the seller based on any means, or desires, known to the user. In one embodiment the minimum purchase price may be zero, or a nominal amount.

In one embodiment, the minimum purchase price selected at SELECT A MINIMUM PURCHASE PRICE FOR THE PRODUCT OPERATION 307 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

In one embodiment, once the minimum purchase price selected at SELECT A MINIMUM PURCHASE PRICE FOR THE PRODUCT OPERATION 307 is entered into a computing system and/or server system, data representing the selected minimum purchase price is transferred to the seller website of PROVIDE A SELLER WEBSITE INCLUDING THE CAPABILITY TO PURCHASE A PRODUCT OPERATION 303 by any one of numerous methods, means, mechanisms and apparatuses for transferring data between two computing systems, databases, server systems, websites, and/or networks, known to those of skill in the art at the time of filing and/or as developed later. In one embodiment, the selected initial purchase price is transferred to the seller website of PROVIDE A SELLER WEBSITE INCLUDING THE CAPABILITY TO PURCHASE A PRODUCT OPERATION 303 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Returning to FIG. 3, in one embodiment, once the seller selects a minimum purchase price at SELECT A MINIMUM PURCHASE PRICE FOR THE PRODUCT OPERATION 307, process flow proceeds to SELECT A TIME INCREMENT TO ASSOCIATE WITH THE PRODUCT OPERATION 309.

In one embodiment at SELECT A TIME INCREMENT TO ASSOCIATE WITH THE PRODUCT OPERATION 309, the seller chooses a time increment to be associated with the product. In one embodiment, the time increment chosen determines how often, i.e., at what time interval the product purchase price is to be discounted. The choice of the time increment at SELECT A TIME INCREMENT TO ASSOCIATE WITH THE PRODUCT OPERATION 309 is highly dependent on: the discount increment selected by the seller at SELECT A DISCOUNT INCREMENT TO ASSOCIATE WITH THE PRODUCT OPERATION 311, as discussed below; the type of product being offered for sale; the initial purchase price selected at SELECT AN INITIAL PURCHASE PRICE FOR THE PRODUCT OPERATION 305; the minimum purchase price selected at SELECT A MINIMUM PURCHASE PRICE FOR THE PRODUCT OPERATION 307; any seasonal or other product considerations that the seller feels effects the speed at which the product needs to be reduced and/or eliminated from inventory; in the case where the seller website of PROVIDE A SELLER WEBSITE INCLUDING THE CAPABILITY TO PURCHASE A PRODUCT OPERATION 303 is an auction website, the length of time allotted to the product listing within the auction; and any other consideration of interest and/or consequence to the seller.

In one embodiment, the time increment selected at SELECT A TIME INCREMENT TO ASSOCIATE WITH THE PRODUCT OPERATION 309 can range from minutes to months depending on the factors above. In addition, in one embodiment, the time increment can be customized such that the time increment changes as time passes. For instance, in one embodiment, for the first day a product is offered for sale, or other selected timeframe, a first time increment can be used, for instance two hours. Then on the second day, or other selected timeframe, a second time increment, for instance four hours, can be used. This customization of time increments over time is particularly useful when combined with customizable discount increments as discussed below with respect to SELECT A DISCOUNT INCREMENT TO ASSOCIATE WITH THE PRODUCT OPERATION 311. In addition, the customizable time increment feature can be used to establish a pre-announcement period for a product sale by selecting a relatively long first, or beginning time increment, for instance a first time increment of 24 or 48 hours.

In one embodiment, the time increment selected at SELECT A TIME INCREMENT TO ASSOCIATE WITH THE PRODUCT OPERATION 309 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

In one embodiment, once the time increment selected at SELECT A TIME INCREMENT TO ASSOCIATE WITH THE PRODUCT OPERATION 309 is entered into a computing system and/or server system, data representing the selected time increment is transferred to the seller website of PROVIDE A SELLER WEBSITE INCLUDING THE CAPABILITY TO PURCHASE A PRODUCT OPERATION 303 by any one of numerous methods, means, mechanisms and apparatuses for transferring data between two computing systems, databases, server systems, websites, and/or networks, known to those of skill in the art at the time of filing and/or as developed later. In one embodiment, the selected time increment data is transferred to the seller website of PROVIDE A SELLER WEBSITE INCLUDING THE CAPABILITY TO PURCHASE A PRODUCT OPERATION 303 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

In one embodiment, once a time increment is selected at SELECT A TIME INCREMENT TO ASSOCIATE WITH THE PRODUCT OPERATION 309, process flow proceeds to SELECT A DISCOUNT INCREMENT TO ASSOCIATE WITH THE PRODUCT OPERATION 311.

In one embodiment, at SELECT A DISCOUNT INCREMENT TO ASSOCIATE WITH THE PRODUCT OPERATION 311 the seller selects a discount increment to be applied to the purchase price of the product after the passing of each of the time increment selected at SELECT A TIME INCREMENT TO ASSOCIATE WITH THE PRODUCT OPERATION 309.

The choice of the discount increment at SELECT A DISCOUNT INCREMENT TO ASSOCIATE WITH THE PRODUCT OPERATION 311 is highly dependent on: the time increment selected by the seller at SELECT A TIME INCREMENT TO ASSOCIATE WITH THE PRODUCT OPERATION 309, as discussed above; the type of product being offered for sale; the initial purchase price selected at SELECT AN INITIAL PURCHASE PRICE FOR THE PRODUCT OPERATION 305; the minimum purchase price selected at SELECT A MINIMUM PURCHASE PRICE FOR THE PRODUCT OPERATION 307; any seasonal or other product Considerations that the seller feels effects the speed at which the product needs to be reduced and/or eliminated from inventory; in the case where the seller website of PROVIDE A SELLER WEBSITE INCLUDING THE CAPABILITY TO PURCHASE A PRODUCT OPERATION 303 is an auction website, the length of time allotted to the product listing within the auction; and any other consideration of interest and/or consequence to the seller.

In one embodiment, the discount increment selected at SELECT A DISCOUNT INCREMENT TO ASSOCIATE WITH THE PRODUCT OPERATION 311 is a monetary amount to be subtracted from the product purchase price each of the intervals of SELECT A TIME INCREMENT TO ASSOCIATE WITH THE PRODUCT OPERATION 309. In one embodiment, the discount increment selected at SELECT A DISCOUNT INCREMENT TO ASSOCIATE WITH THE PRODUCT OPERATION 311 is a percentage of the product purchase price of the previous time interval, as an example, a discount of 10% of the previous intervals purchase price. In other embodiments, the discount increment selected at SELECT A DISCOUNT INCREMENT TO ASSOCIATE WITH THE PRODUCT OPERATION 311 is user defined and/or customizable based on the needs and/or desires of the user, the seller website provider, or the provider of process for time incremented purchase price discounting 300.

In addition, in one embodiment, the discount increment selected at SELECT A DISCOUNT INCREMENT TO ASSOCIATE WITH THE PRODUCT OPERATION 311 can be customized such that the discount increment varies as time passes, or after a defined number of time increments of SELECT A TIME INCREMENT TO ASSOCIATE WITH THE PRODUCT OPERATION 309 pass. For instance, in one embodiment, on the first day, or other selected timeframe, a first discount increment can be used, for instance 20% of the previous time increments purchase price, or a specified monetary amount, such as $20.00. Then on the second day, or other selected timeframe, a second discount increment, for instance 10% of the previous time increments purchase price, or a specified monetary amount, such as $10.00, can be used. This process can be repeated for any number of relevant time frames and/or discount increments desired. The optional customization of discount increments over time at SELECT A DISCOUNT INCREMENT TO ASSOCIATE WITH THE PRODUCT OPERATION 311 is also useful when combined with customizable time increments as discussed above with respect to SELECT A TIME INCREMENT TO ASSOCIATE WITH THE PRODUCT OPERATION 309.

In one embodiment, the discount increment selected at SELECT A DISCOUNT INCREMENT TO ASSOCIATE WITH THE PRODUCT OPERATION 311 is entered into a computing system, such as computing systems 100, 150 of FIG. 1, or a server system, such as server system 120 of FIG. 1, by the seller using an interface device, including, but not limited to: a mouse, such as mouse 111, 161 of FIG. 1; a keyboard, such as keyboard 107, 157 of FIG. 1; a touchpad; a stylus; voice-activated software; or any other device known at the time of filing or as developed thereafter for converting user actions into computing system and/or processor actions, instructions, or events.

In one embodiment, once the discount increment selected at SELECT A DISCOUNT INCREMENT TO ASSOCIATE WITH THE PRODUCT OPERATION 311 is entered into a computing system and/or server system, data representing the selected discount increment is transferred to the seller website of PROVIDE A SELLER WEBSITE INCLUDING THE CAPABILITY TO PURCHASE A PRODUCT OPERATION 303 by any one of numerous methods, means, mechanisms and apparatuses for transferring data between two computing systems, databases, server systems, websites, and/or networks, known to those of skill in the art at the time of filing and/or as developed later. In one embodiment, the selected discount increment data is transferred to the seller website of PROVIDE A SELLER WEBSITE INCLUDING THE CAPABILITY TO PURCHASE A PRODUCT OPERATION 303 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Those of skill the art will readily recognize that the choice of operations discussed above, and, in particular, the order of the operations: SELECT AN INITIAL PURCHASE PRICE FOR THE PRODUCT OPERATION 305; SELECT A MINIMUM PURCHASE PRICE FOR THE PRODUCT OPERATION 307; SELECT A TIME INCREMENT TO ASSOCIATE WITH THE PRODUCT OPERATION 309; and SELECT A DISCOUNT INCREMENT TO ASSOCIATE WITH THE PRODUCT OPERATION 311, shown above was chosen for illustrative purposes only and that the operations discussed above could, in other embodiments, be performed in any order to meet the desires and/or needs of the seller. Consequently the order of operations discussed above in no way limits the scope of the invention.

In one embodiment, once the discount increment is selected by the seller at SELECT A DISCOUNT INCREMENT TO ASSOCIATE WITH THE PRODUCT OPERATION 311, process flow proceeds to LIST/DISPLAY THE SELECTED PRODUCT ON THE SELLER WEBSITE AT THE INITIAL PURCHASE PRICE OPERATION 313.

In one embodiment, at LIST/DISPLAY THE SELECTED PRODUCT ON THE SELLER WEBSITE AT THE INITIAL PURCHASE PRICE OPERATION 313 the product is listed, and/or displayed, on the seller website of PROVIDE A SELLER WEBSITE INCLUDING THE CAPABILITY TO PURCHASE A PRODUCT OPERATION 303 at the initial purchase price of SELECT AN INITIAL PURCHASE PRICE FOR THE PRODUCT OPERATION 305. In one embodiment, as noted above, in addition to the initial purchase price of SELECT AN INITIAL PURCHASE PRICE FOR THE PRODUCT OPERATION 305, the seller website includes: the data representing the discount increment to be applied to the product purchase price of SELECT A DISCOUNT INCREMENT TO ASSOCIATE WITH THE PRODUCT OPERATION 311; the data representing the time increment to be applied to the product purchase price of SELECT A TIME INCREMENT TO ASSOCIATE WITH THE PRODUCT OPERATION 309; and data representing the minimum purchase price of SELECT A MINIMUM PURCHASE PRICE FOR THE PRODUCT OPERATION 307.

In one embodiment, once the product is listed by the seller on the seller website of PROVIDE A SELLER WEBSITE INCLUDING THE CAPABILITY TO PURCHASE A PRODUCT OPERATION 303 at the initial purchase price of SELECT AN INITIAL PURCHASE PRICE FOR THE PRODUCT OPERATION 305 at LIST/DISPLAY THE SELECTED PRODUCT ON THE SELLER WEBSITE AT THE INITIAL PURCHASE PRICE OPERATION 313, process flow proceeds to ALLOW BUYERS TO SUBMIT MAXIMUM PRICE BIDS TO THE SELLER WEBSITE OPERATION 314.

In one embodiment, at ALLOW BUYERS TO SUBMIT MAXIMUM PRICE BIDS TO THE SELLER WEBSITE OPERATION 314 potential buyers are provided the opportunity to place maximum purchase price bids for the product through the seller website of PROVIDE A SELLER WEBSITE INCLUDING THE CAPABILITY TO PURCHASE A PRODUCT OPERATION 303. In one embodiment, the seller website of PROVIDE A SELLER WEBSITE INCLUDING THE CAPABILITY TO PURCHASE A PRODUCT OPERATION 303 is an auction website and the maximum purchase price bids are the maximum bids of a maximum bid feature such as is offered by numerous auction websites and are well known to those of skill in the art. In other embodiments, the seller website of PROVIDE A SELLER WEBSITE INCLUDING THE CAPABILITY TO PURCHASE A PRODUCT OPERATION 303 is a more traditional seller's electronic storefront and the potential buyers are provided an interface with the seller website for transferring data representing maximum purchase price bids through any one of numerous methods, means, mechanisms and apparatuses for transferring data between two computing systems, databases, server systems, websites, and/or networks, known to those of skill in the art at the time of filing and/or as developed later. In one embodiment, the buyer's maximum purchase price bids are transferred to the seller website of PROVIDE A SELLER WEBSITE INCLUDING THE CAPABILITY TO PURCHASE A PRODUCT OPERATION 303 over the Internet, or other private or public network, such as network 130 of FIG. 1. As noted above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

In one embodiment, when two buyers submit the same maximum purchase price bid, the seller website keeps track of which buyer submitted the maximum purchase price bid first. In one embodiment, as discussed in more detail below, when two or more buyers submit identical maximum purchase price bids, and the discounted purchase price of the product matches the submitted maximum purchase price bids, the product is sold to the buyer who submitted the maximum purchase price bid first.

In one embodiment, once potential buyers are provided the opportunity to submit maximum purchase price bids at ALLOW BUYERS TO SUBMIT MAXIMUM PRICE BIDS TO THE SELLER WEBSITE OPERATION 314, process flow proceeds to AUTOMATICALLY REDUCE THE INITIAL PURCHASE PRICE OF THE PRODUCT BY THE SELECTED DISCOUNT INCREMENT AFTER EACH SELECTED TIME INCREMENT UNTIL THE PRODUCT PURCHASE PRICE MATCHES A BUYER'S MAXIMUM BID PRICE OR THE SELECTED MINIMUM PRODUCT PURCHASE PRICE IS REACHED OPERATION 315.

In one embodiment, at AUTOMATICALLY REDUCE THE INITIAL PURCHASE PRICE OF THE PRODUCT BY THE SELECTED DISCOUNT INCREMENT AFTER EACH SELECTED TIME INCREMENT UNTIL THE PRODUCT PURCHASE PRICE MATCHES A BUYER'S MAXIMUM BID PRICE OR THE SELECTED MINIMUM PRODUCT PURCHASE PRICE IS REACHED OPERATION 315, the initial purchase price of the product of SELECT AN INITIAL PURCHASE PRICE FOR THE PRODUCT OPERATION 305 is decreased by an amount equal to the discount increment of SELECT A DISCOUNT INCREMENT TO ASSOCIATE WITH THE PRODUCT OPERATION 311 with the passing of each time increment of SELECT A TIME INCREMENT TO ASSOCIATE WITH THE PRODUCT OPERATION 309 until either the new product purchase price matches one or more of the maximum purchase price bids submitted by the potential buyers at ALLOW BUYERS TO SUBMIT MAXIMUM PRICE BIDS TO THE SELLER WEBSITE OPERATION 314, and the product is purchased, or the product purchase price drops to the minimum purchase price of SELECT A MINIMUM PURCHASE PRICE FOR THE PRODUCT OPERATION 307.

In one embodiment, once the product is either purchased, or the product purchase price drops to the minimum purchase price of SELECT A MINIMUM PURCHASE PRICE FOR THE PRODUCT OPERATION 307 at AUTOMATICALLY REDUCE THE INITIAL PURCHASE PRICE OF THE PRODUCT BY THE SELECTED DISCOUNT INCREMENT AFTER EACH SELECTED TIME INCREMENT UNTIL THE PRODUCT PURCHASE PRICE MATCHES A BUYER'S MAXIMUM BID PRICE OR THE SELECTED MINIMUM PRODUCT PURCHASE PRICE IS REACHED OPERATION 315, process flow proceeds to END OPERATION 321 where process for time incremented purchase price discounting 300 is exited and/or returned to ENTER OPERATION 301.

Using processes for time incremented purchase price discounting 200 and/or 300, a seller is not required to determine a static purchase price at which to either offer the product for sale, or to use as a "buy it now" price on auction website. Instead, using processes for time incremented purchase price discounting 200 and/or 300, a seller can incrementally explore the market price, thereby electronically "trolling" for the highest purchase price the market will bear and by passing the second guessing and uncertainty of current static website pricing methods and systems.

In addition, using processes for time incremented purchase price discounting 200 and/or 300, the exploration of the market price is conducted automatically and by time and discount increments chosen by the seller so that the seller maintains significant control in a hands off manner. Consequently, processes for time incremented purchase price discounting 200 and/or 300 allow the seller to, in essence, conduct real-time market research, without devoting significant time or energy to the process.

In addition, when processes for time incremented purchase price discounting 200 and/or 300 are used within the context of an Internet auction website, or any auction website, many of the auction website strategies are bypassed, or their effects are minimized or negated, due to the fact that as the "buy it now" purchase price of the product listed is discounted in a time incremented manner, the single auction listing becomes essentially a series of time incremented auctions with self adjusting "buy it now" auction bypass prices. Consequently, the strategy discussed above involving a buyer, or buyers, waiting until the last minute to submit insignificant bid increases is not effective because the incrementally decreasing "buy it now" price provides a bypass or opt out of the timed biding option and therefore allows normal market forces to reemerge and dictate the sale price.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "selecting", "providing", "listing", "allowing", "reducing", "processing", "displaying", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for a process or application for time incremented purchase price discounting, discussed herein, are identified using a particular nomenclature for ease of description and understanding, but other nomenclature is often used in the art to identify equivalent operations.

In addition, the order of operations depicted in the FIG.s and discussed above was chosen for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A system for time incremented purchase price discounting comprising:
    a computing system;
    a seller website, the seller website including the capability to sell a product; and
    a processor for executing a process for time incremented purchase price discounting, the process for time incremented purchase price discounting comprising:
        selecting an initial purchase price for the product, the initial purchase price for the product being a price for which a seller will sell the product to a buyer;
        selecting a plurality of different time increments and a different implementation time period for each of the time increments of the plurality, each of the different time increments of the plurality being associated with the product;
        selecting a plurality of different discount increments, the discount increments of the plurality being associated with the product, the system implementing either percentage increments or monetary amount increments based on user selection, each of the different discount increments of the plurality of discount increments being associated with individual ones of the time increments of the plurality of time increments;
        offering the product for sale on the seller website at the initial purchase price for the product; and
        automatically discounting the initial purchase price of the product according to the time and discount increments and offering the product for sale at the discounted purchase price according to those time and discount increments.

2. The system for time incremented purchase price discounting of claim 1, wherein:
    the seller website is a seller's electronic storefront.

3. The system for time incremented purchase price discounting of claim 1, wherein:
    the seller website is a seller's retail sales website.

4. The system for time incremented purchase price discounting of claim 1, wherein:
    the seller website is an auction website.

5. The system for time incremented purchase price discounting of claim 4, wherein:
    the initial purchase price is an initial "buy it now price"; and
    for each selected increment of time elapsed, the initial "buy it now" price is automatically discounted by the selected discount increment.

6. The system for time incremented purchase price discounting of claim 1, further comprising:

selecting a minimum purchase price for the product; and for each selected increment of time elapsed, automatically discounting the initial purchase price of the product by the selected discount increment until the product is purchased or the purchase price for the product is equal to the selected minimum purchase price of the product.

7. The system for time incremented purchase price discounting of claim 6, wherein:

the initial purchase price is an initial "buy it now price"; and for each selected increment of time elapsed, the initial "buy it now" price is automatically discounted by the selected discount increment until the product is purchased or the "buy it now" price for the product is equal to the selected minimum purchase price of the product.

8. The system for time incremented purchase price discounting of claim 1, further comprising:

providing buyers with the capability to submit maximum purchase price bids;

for each selected increment of time elapsed, automatically discounting the initial purchase price of the product by the selected discount increment; and if one or more maximum purchase price bids is matched by the discounted product purchase price, selling the product for the matched maximum price bid amount.

9. The system for time incremented purchase price discounting of claim 8, wherein:

the initial purchase price is an initial "buy it now price";

for each selected increment of time elapsed, automatically discounting the initial "buy it now" price by the selected discount increment; and if one or more maximum purchase price bids is matched by the discounted "buy it now" price, selling the product for the matched maximum price bid amount.

10. A computer program product for time incremented purchase price discounting comprising:

a nontransitory computer readable medium;

and computer program code, encoded on the computer readable medium, comprising computer readable instructions for:

accessing a seller website, the seller website including the capability to sell a product;

selecting an initial purchase price for the product, the initial purchase price for the product being a price for which a seller will sell the product to a buyer;

selecting a plurality of different time increments and a different implementation time period for each of the time increments of the plurality, each of the different time increments of the plurality being associated with the product;

selecting a plurality of different discount increments, the discount increments of the plurality being associated with the product, the system implementing either percentage increments or monetary amount increments based on user selection, each of the different discount increments of the plurality of discount increments being associated with individual ones of the time increments of the plurality of time increments;

offering the product for sale on the seller website at the initial purchase price for the product; and automatically discounting the initial purchase price of the product according to the time and discount increments and offering the product for sale at the discounted purchase price according to those time and discount increments.

11. The computer program product for time incremented purchase price discounting of claim 10, wherein:

the seller website is a seller's electronic storefront.

12. The computer program product for time incremented purchase price discounting of claim 10, wherein:

the seller website is a seller's retail sales website.

13. The computer program product for time incremented purchase price discounting of claim 10, wherein:

the seller website is an auction website.

14. The computer program product for time incremented purchase price discounting of claim 13, wherein:

the initial purchase price is an initial "buy it now price"; and for each selected increment of time elapsed, the initial "buy it now" price is automatically discounted by the selected discount increment.

15. The computer program product for time incremented purchase price discounting of claim 10, wherein;

the computer program code, encoded on the computer readable medium, further comprises instructions for:

selecting a minimum purchase price for the product; and for each selected increment of time elapsed, automatically discounting the initial purchase price of the product by the selected discount increment until the product is purchased or the purchase price for the product is equal to the selected minimum purchase price of the product.

16. The computer program product for time incremented purchase price discounting of claim 15, wherein:

the initial purchase price is an initial "buy it now price"; and for each selected increment of time elapsed, the initial "buy it now" price is automatically discounted by the selected discount increment until the product is purchased or the "buy it now" price for the product is equal to the selected minimum purchase price of the product.

17. The computer program product for time incremented purchase price discounting of claim 10, wherein;

the computer program code, encoded on the computer readable medium, further comprises instructions for:

providing buyers with the capability to submit maximum purchase price bids;

for each selected increment of time elapsed, automatically discounting the initial purchase price of the product by the selected discount increment; and if one or more maximum purchase price bids is matched by the discounted product purchase price, selling the product for the matched maximum price bid amount.

18. The computer program product for time incremented purchase price discounting of claim 17, wherein:

the initial purchase price is an initial "buy it now price";

for each selected increment of time elapsed, automatically discounting the initial "buy it now" price by the selected discount increment; and if one or more maximum purchase price bids is matched by the discounted "buy it now" price, selling the product for the matched maximum price bid amount.

\* \* \* \* \*

UNITED STATES PATENT AND TRADEMARK OFFICE
CERTIFICATE OF CORRECTION

PATENT NO. : 7,941,344 B1  
APPLICATION NO. : 11/550721  
DATED : May 10, 2011  
INVENTOR(S) : Ryan Martin Bickerstaff Page 1 of 1

It is certified that error appears in the above-identified patent and that said Letters Patent is hereby corrected as shown below:

In Column 28, Line 61, Claim 5, replace ""buy it now price"" with --"buy it now" price--;
In Column 29, Line 9, Claim 7, replace ""buy it now price"" with --"buy it now" price--;
In Column 29, Line 28, Claim 9, replace ""buy it now price"" with --"buy it now" price--;
In Column 30, Line 15, Claim 14, replace ""buy it now price"" with --"buy it now" price--;
In Column 30, Line 32, Claim 16, replace ""buy it now price"" with --"buy it now" price--; and
In Column 30, Line 53, Claim 18, replace ""buy it now price"" with --"buy it now" price--.

Signed and Sealed this
Second Day of October, 2012

David J. Kappos
*Director of the United States Patent and Trademark Office*